US011898390B2

(12) United States Patent
Branch et al.

(10) Patent No.: US 11,898,390 B2
(45) Date of Patent: Feb. 13, 2024

(54) DOUBLE JOINTED DOOR HINGE

(71) Applicant: Lifetime Products, Inc., Clearfield, UT (US)

(72) Inventors: Paul Craig Branch, Layton, UT (US); Clarissa Mae Stuart, Layton, UT (US); Neil Ben Watson, Layton, UT (US); Kenneth William Taylor, Roy, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

(21) Appl. No.: 16/836,073

(22) Filed: Mar. 31, 2020

(65) Prior Publication Data

US 2020/0318406 A1 Oct. 8, 2020

Related U.S. Application Data

(60) Provisional application No. 62/830,160, filed on Apr. 5, 2019.

(51) Int. Cl.
*E05D 3/12* (2006.01)

(52) U.S. Cl.
CPC .......... *E05D 3/12* (2013.01); *E05Y 2900/132* (2013.01)

(58) Field of Classification Search
CPC ... E05D 3/12; E05Y 2900/132; Y10T 16/547; E06B 3/32; E06B 3/127
See application file for complete search history.

(56) References Cited

U.S. PATENT DOCUMENTS 5,060,631 A * 10/1991 Lin ......................... F24B 1/192 126/544
5,224,241 A * 7/1993 Williams .................. E05D 7/04 16/253
5,493,760 A * 2/1996 Takimoto ................ E05D 11/06 16/376

(Continued)

FOREIGN PATENT DOCUMENTS

CN 1692210 A 11/2005
CN 102966280 A 3/2013

(Continued)

OTHER PUBLICATIONS

International Search Report and Written Opinion received for PCT Patent Application No. PCT/US20/026149, dated Jul. 16, 2020, 9 pages.

(Continued)

*Primary Examiner* — Victor D Batson
*Assistant Examiner* — Matthew J Sullivan
(74) *Attorney, Agent, or Firm* — Workman Nydegger

(57) ABSTRACT

In one example, a double jointed hinge connects a blow molded plastic door and a blow molded plastic wall panel. The double jointed hinge includes a first hinge element that defines a first axis of rotation, and the first hinge element is connected to the blow molded plastic wall panel, a second hinge element that defines a second axis of rotation and is connected to the blow molded plastic door, and the second hinge element is spaced apart from the first hinge element, and a first link and a second link, the first link and the second link connecting the first hinge element to the second hinge element.

24 Claims, 5 Drawing Sheets

(56) References Cited

U.S. PATENT DOCUMENTS

| | | | | | |
|---|---|---|---|---|---|
| 5,782,282 | A * | 7/1998 | Chen | E05D 3/12 | 16/250 |
| 6,256,839 | B1 * | 7/2001 | Wu | E05D 3/12 | 16/283 |
| 7,331,480 | B1 * | 2/2008 | Nolan | E05D 7/1011 | 220/6 |
| 7,886,406 | B2 * | 2/2011 | Chang | E05D 5/127 | 16/252 |
| 8,162,386 | B2 * | 4/2012 | Namura | E05D 3/127 | 16/366 |
| 8,621,712 | B2 * | 1/2014 | Pate, Jr. | E05F 1/1207 | 49/326 |
| 8,713,857 | B2 * | 5/2014 | Logue | A47G 5/00 | 52/36.6 |
| 8,800,110 | B1 * | 8/2014 | Stephenson | E05D 7/0423 | 16/245 |
| 9,032,670 | B2 * | 5/2015 | Vogler | E04H 1/005 | 52/79.9 |
| 9,062,484 | B2 * | 6/2015 | Miller | E05D 15/12 | |
| 9,187,940 | B2 * | 11/2015 | Chandler | E05D 3/08 | |
| 9,816,303 | B2 * | 11/2017 | Lee | E05D 5/0276 | |
| 10,946,688 | B1 * | 3/2021 | Wilson | B42D 1/06 | |
| 2003/0051313 | A1 | 3/2003 | Wu | | |
| 2006/0037519 | A1 | 2/2006 | Dunstan | | |
| 2006/0277852 | A1 | 12/2006 | Mower et al. | | |
| 2009/0001232 | A1 * | 1/2009 | Seo | G06F 1/1688 | 248/176.1 |
| 2010/0132895 | A1 | 6/2010 | Logue | | |
| 2014/0283463 | A1 | 9/2014 | Vogler et al. | | |
| 2018/0274231 | A1 * | 9/2018 | Epstein | E04B 2/7442 | |
| 2020/0190881 | A1 * | 6/2020 | Wu | E05F 1/1215 | |
| 2020/0205956 | A1 | 7/2020 | Sufyan et al. | | |

FOREIGN PATENT DOCUMENTS

| | | | | |
|---|---|---|---|---|
| DE | 202019001427 U1 | * | 4/2019 | E05D 3/12 |
| DE | 202019001427 U1 | * | 6/2019 | |
| GB | 521629 A | * | 5/1940 | |

OTHER PUBLICATIONS

International Preliminary Report on Patentability received for PCT Patent Application No. PCT/US20/026149, dated Oct. 14, 2021, 7 pages.

European Search Report received for EP Patent Application No. 20784499A, dated Nov. 29, 2022, 8 pages.

* cited by examiner

FIG. 1A
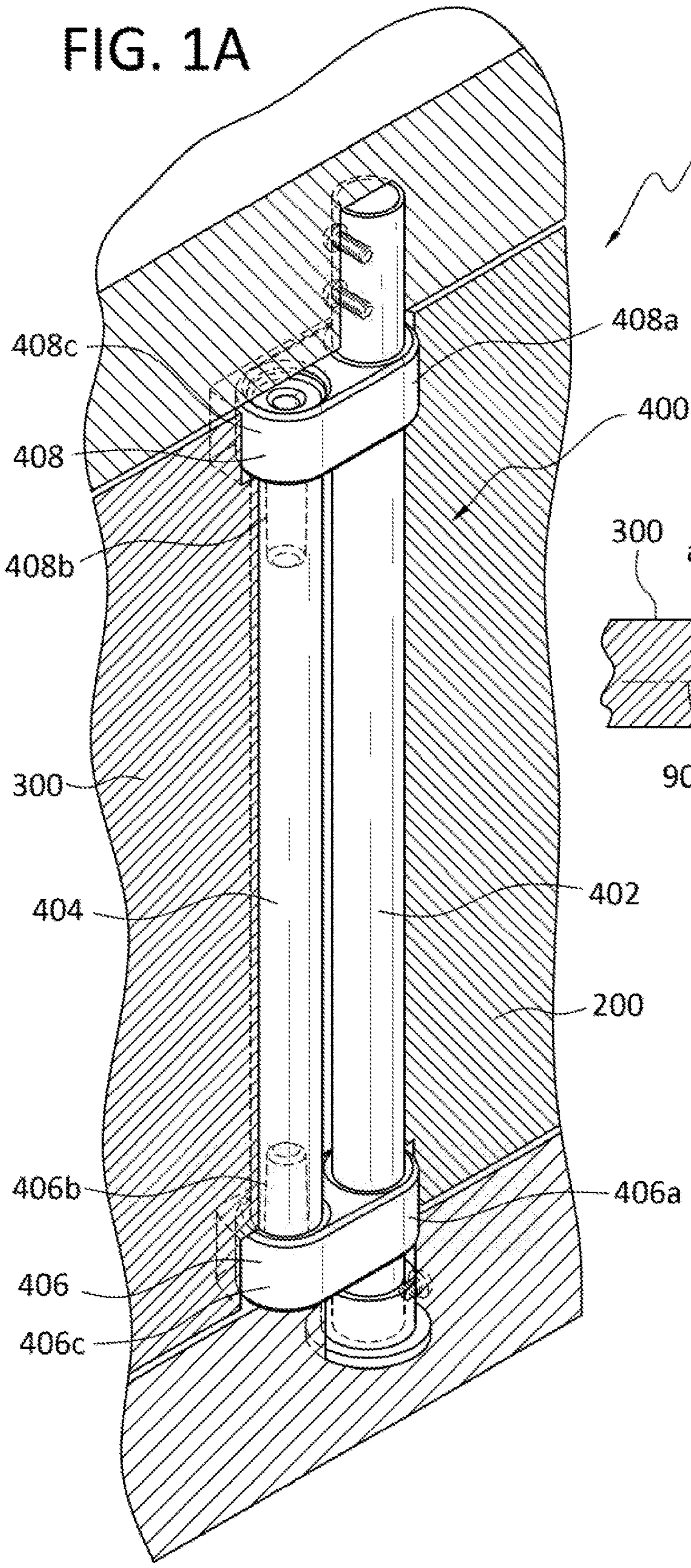
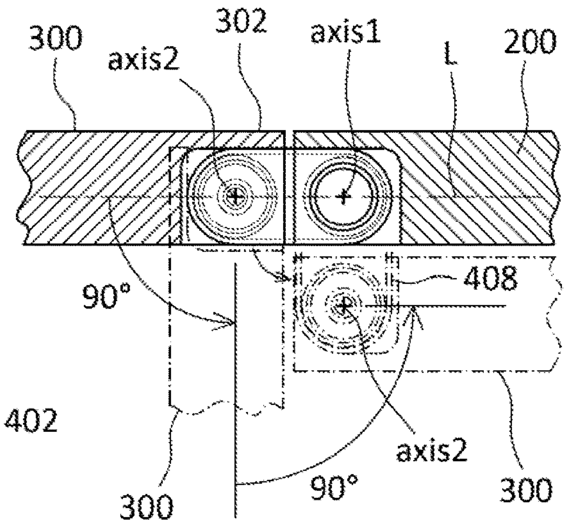
FIG. 1B

FIG. 3
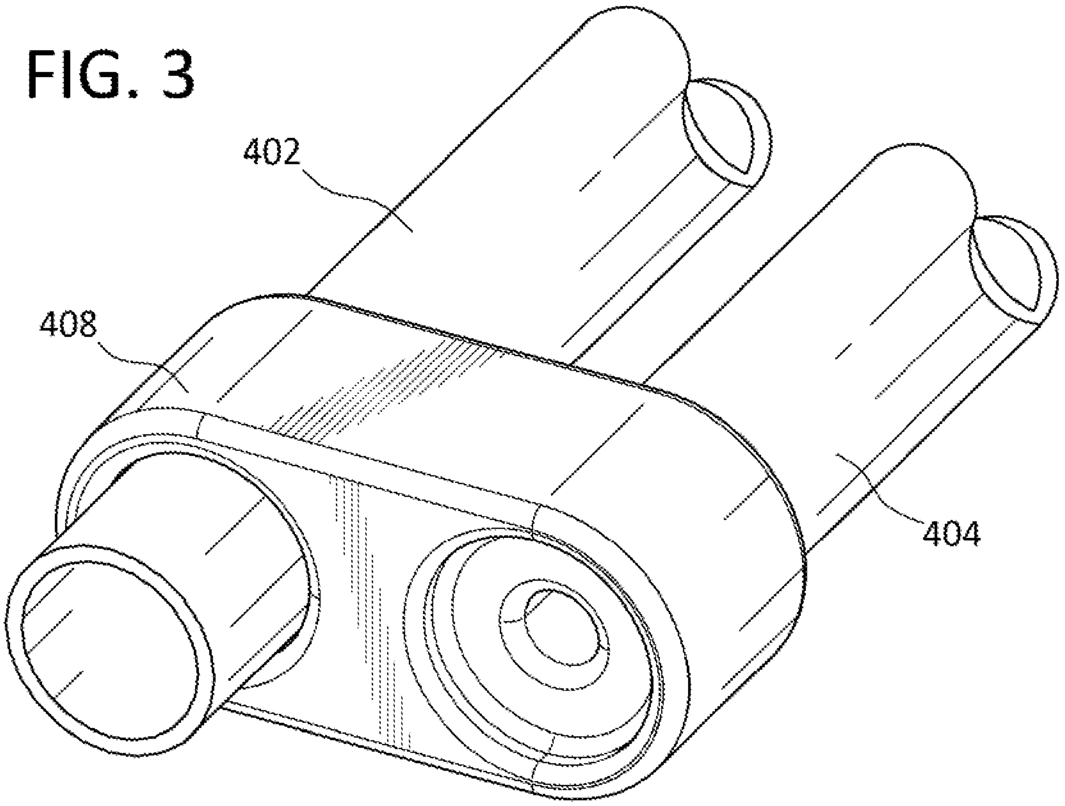
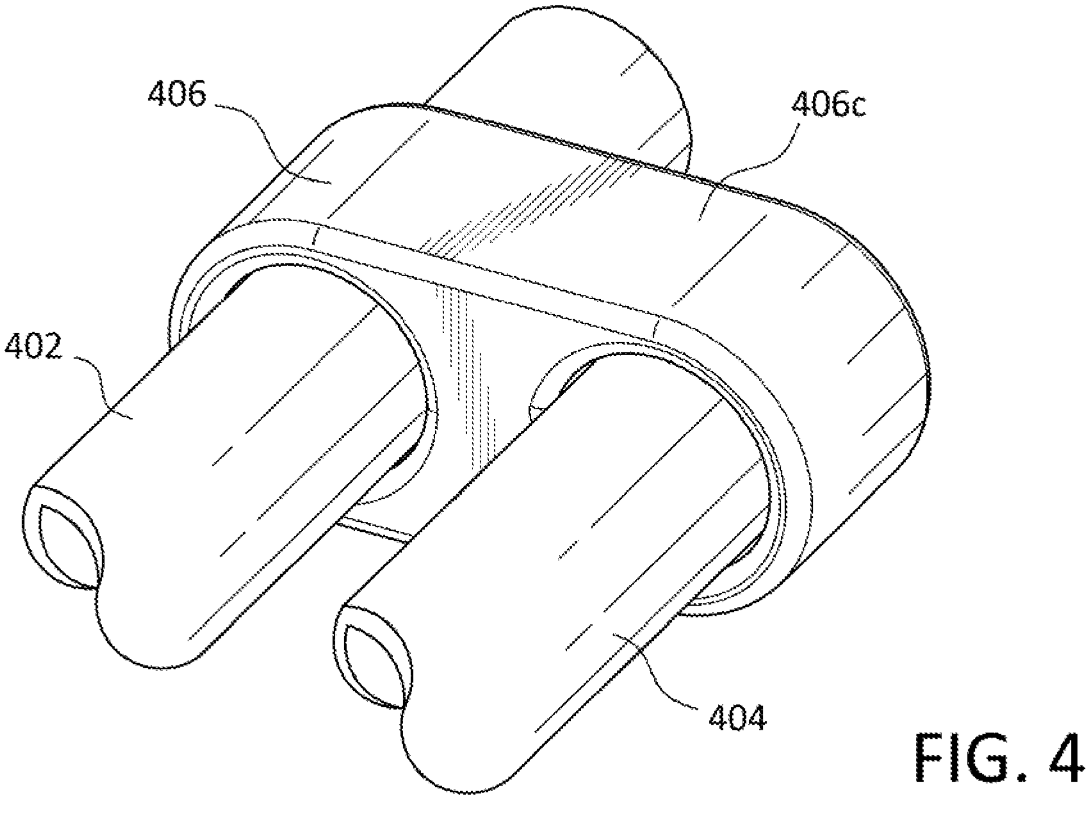
FIG. 4

DOUBLE JOINTED DOOR HINGE

RELATED APPLICATIONS

This application hereby claims priority to U.S. Provisional Patent Application, Ser. No. 62/830,160, entitled DOUBLE JOINTED DOOR HINGE, and filed Apr. 5, 2019. All of the aforementioned applications are incorporated herein in their respective entireties by this reference.

FIELD OF THE INVENTION

The present disclosure is generally concerned with hinges suitable for use with panels, doors, and other structures. More specifically, some example embodiments are concerned with a double jointed hinge that rotatably connects two elements together, such as a door and a wall panel for example, while enabling one of the elements to rotate at least about 180 degrees with respect to the other element.

BACKGROUND

Many door hinges used in applications such as outdoor sheds, for example, are only capable of rotating about 90 degrees relative to the structure to which they are connected. This is problematic because the door, even when fully open, blocks part of the doorway defined by the structure, thereby limiting the usefulness of the doorway. As well, a door attached with hinges limited to an operating range of about 90 degrees or less can act as an obstruction since the door, when fully open, extends outward in a generally perpendicular direction relative to the wall or panel to which it is connected. Further, movement of the door beyond about 90 degrees open can damage the door and/or the structure to which it is attached. Finally, door sag, and torque, are problems experienced with conventional hinge constructions and usage.

ASPECTS OF SOME EXAMPLE EMBODIMENTS

It should be noted that the embodiments disclosed herein do not constitute an exhaustive summary of all possible embodiments, nor does this brief summary constitute an exhaustive list of all aspects of any particular embodiment (s). Rather, this brief summary simply presents selected aspects of some example embodiments. It should further be noted that nothing herein should be construed as constituting an essential or indispensable component of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular technical effect(s) or solution(s).

Example embodiments comprise a hinge that may be used to rotatably connect one structure to another structure. One or both of the structures may be rotatable relative to the other of the structures. The hinge may enable one of the connected structures to rotate more than about 90 degrees, and as far as about 180 degrees, relative to the other structure so that when the rotating structure is in a fully open position, the rotating structure may be generally parallel to the other structure. Depending upon the embodiment, more than one hinge may be employed to connect structures together.

With the foregoing in view, any of the following components and combinations alone, or in any combination with each other, define various example embodiments of the invention:

a double jointed hinge that defines a first axis of rotation and a second axis of rotation;

a double jointed hinge that defines a first axis of rotation and a second axis of rotation, and one of the axes of rotation is fixed relative to the other axis of rotation;

a double jointed hinge that defines a first axis of rotation and a second axis of rotation, and one of the axes of rotation is movable relative to the other axis of rotation;

a double jointed hinge that defines a first axis of rotation and a second axis of rotation, and one of the axes of rotation is rotatable about the other axis of rotation;

a double jointed hinge comprising two links that connect the components that define respective first and second axes of rotation of the double jointed hinge;

a double jointed hinge connectible to first and second structures and configured to enable the first structure to rotate to a position such that the first structure is arranged at an angle relative to the second structure, and the angle is in the range of about 170 degrees to about 190 degrees;

a double jointed hinge defining first and second axes of rotation and connectible to first and second structures and configured to enable the first structure, when in a closed position relative to the second structure, to first rotate about the second axis of rotation and, subsequently, to rotate about the first axis of rotation;

a double jointed hinge defining first and second axes of rotation and connectible to first and second structures and configured to enable the first structure, when in a closed position relative to the second structure, to first rotate no more than about 90-95 degrees about the second axis of rotation and, after that rotation, to rotate about 90-95 degrees about the first axis of rotation to a fully open position;

a double jointed hinge that comprises a wall tube and a door tube connected to each other with a first link and a second link;

a double jointed hinge that includes a door tube, and a wall tube notched at each end so as to engage a corresponding structure of a respective link;

a double jointed hinge that comprises a wall tube and a door tube connected to each other with a first link and a second link, and each of the links includes a first portion configured to receive part of the wall tube, and a second portion configured to be received in the door tube;

a double jointed hinge that enables a first structure, such as a door for example, to (i) be rotated relative to a second structure to which the first structure is connected by the double jointed hinge, while also enabling the first structure to (ii) be moved into, and out of, a plane that is parallel to a plane in which that first structure is disposed, and to (iii) reside in the same plane as the second structure to which the first structure is connected;

a double jointed hinge that enables a structure such as a door to be positioned so that the structure does not block any portion of an associated opening, such as a doorway;

first and second structures rotatably connected to each other with any of the disclosed double jointed hinges;

first and second structures rotatably connected to each other with one or more instances of any of the disclosed double jointed hinges;

first and second structures rotatably connected to each other with a plurality of hinges, and any one or more of the plurality of hinges comprises any of the disclosed double jointed hinges;

a door rotatably connected to a wall with any of the disclosed double jointed hinges;

a blow molded plastic door rotatably connected to a blow molded plastic wall panel with any of the disclosed double jointed hinges;

a shed including first and second portions connected to each other by any of the disclosed double jointed hinges; and a shed including a wall and door connected to each other by any of the disclosed double jointed hinges; and a shed including a blow molded plastic wall panel and a blow molded plastic door connected to each other by any of the disclosed double jointed hinges.

As will be apparent to one of skill in the art, any of the aforementioned elements, and combinations of elements, can be combined with any of the other elements disclosed herein, including those elements disclosed in the Figures. As such, any of the aforementioned elements, and combinations of the aforementioned elements, even if not specifically enumerated or recited, are considered to be fully disclosed and within the scope of the invention.

BRIEF DESCRIPTION OF THE DRAWINGS

The appended drawings contain figures of some example embodiments to further explain various aspects of the present disclosure. It will be appreciated that these drawings depict only some embodiments of the disclosure and are not intended to limit its scope in any way. The disclosure will be described and explained with additional specificity and detail through the use of the accompanying drawings.

FIG. 1*a* is a side perspective view of an example double jointed hinge.

FIG. 1*b* is a top view of the example double jointed hinge in FIG. 1.

FIG. 3 is a view of a portion of an upper end of an example double jointed hinge.

FIG. 4 is a view of a portion of a lower end of an example double jointed hinge.

DETAILED DESCRIPTION OF SOME EXAMPLE EMBODIMENTS

Figure 2:
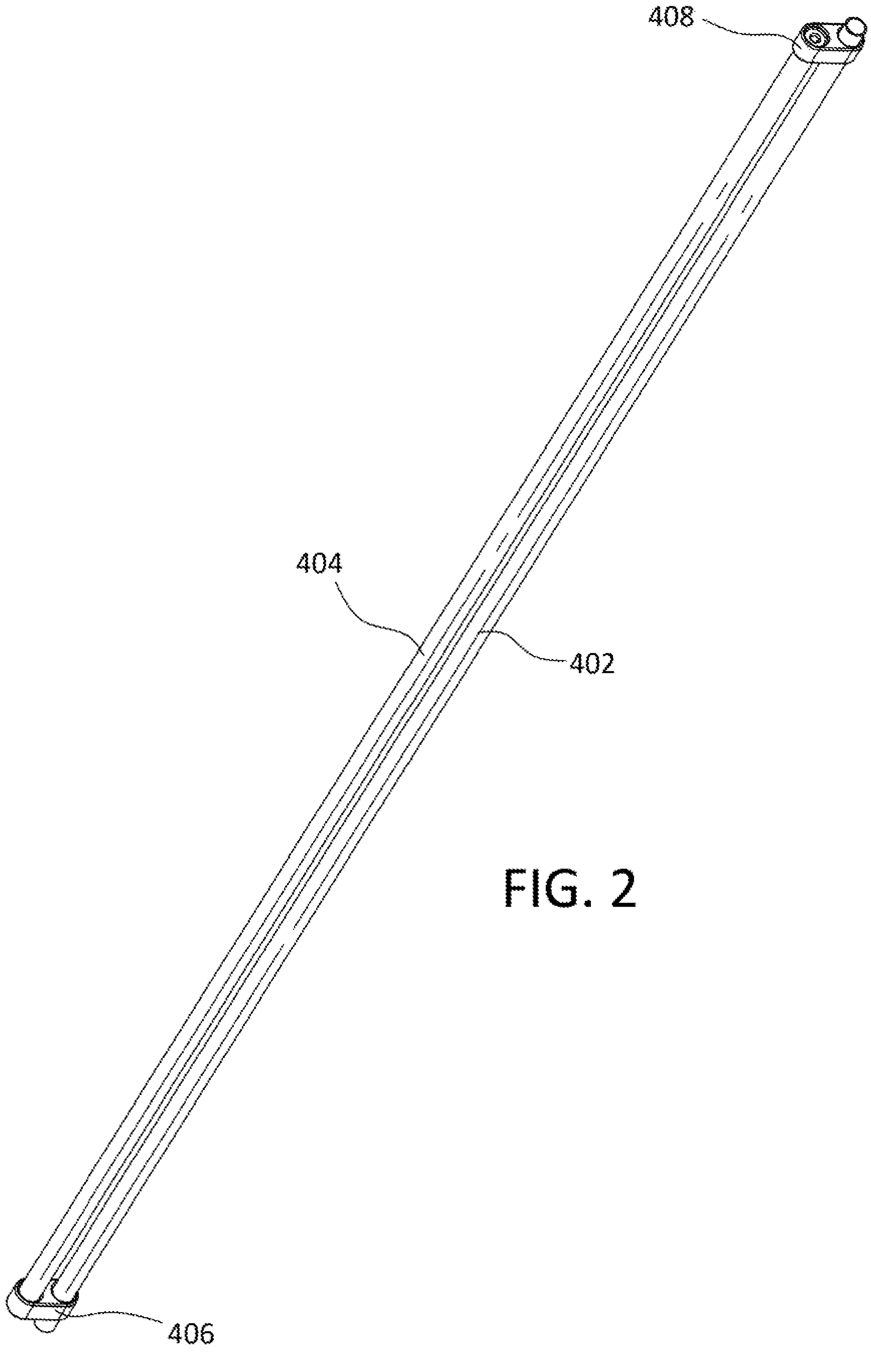
FIG. 2 is a top perspective view of an example double jointed hinge.
Figure 5:
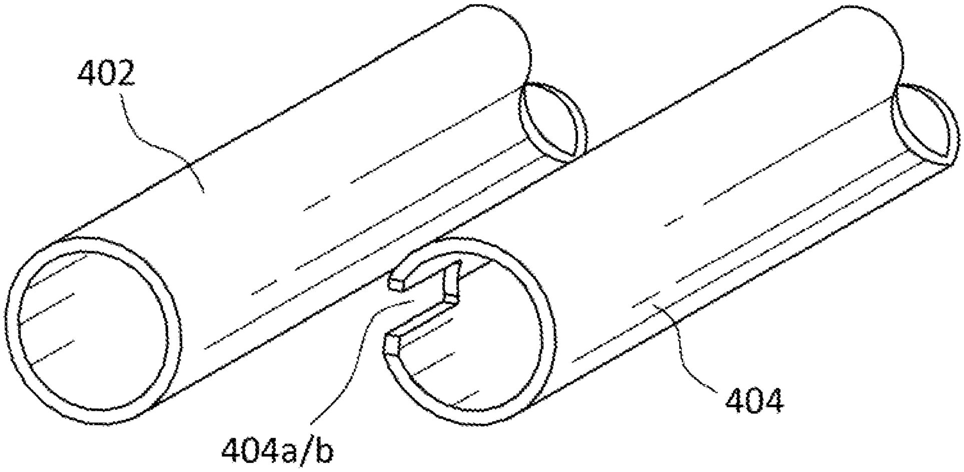
FIG. 5 is a partial perspective view of an example wall tube and an example door tube.
Figure 6:
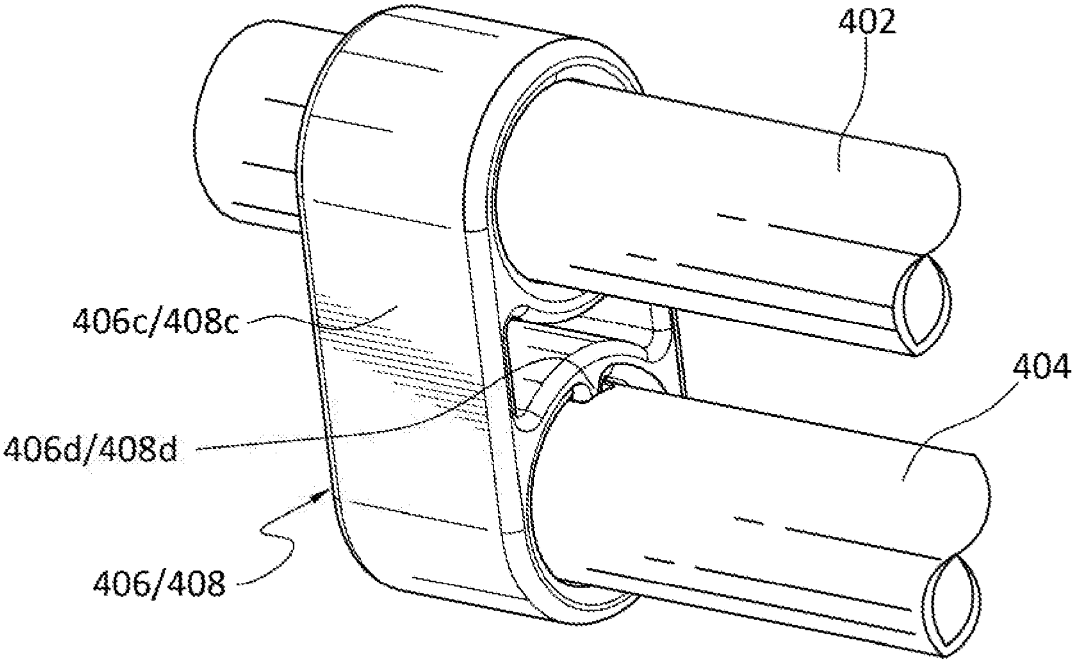
FIG. 6 is a partial view of an example link connecting an example wall tube and an example door tube.
Figure 7:
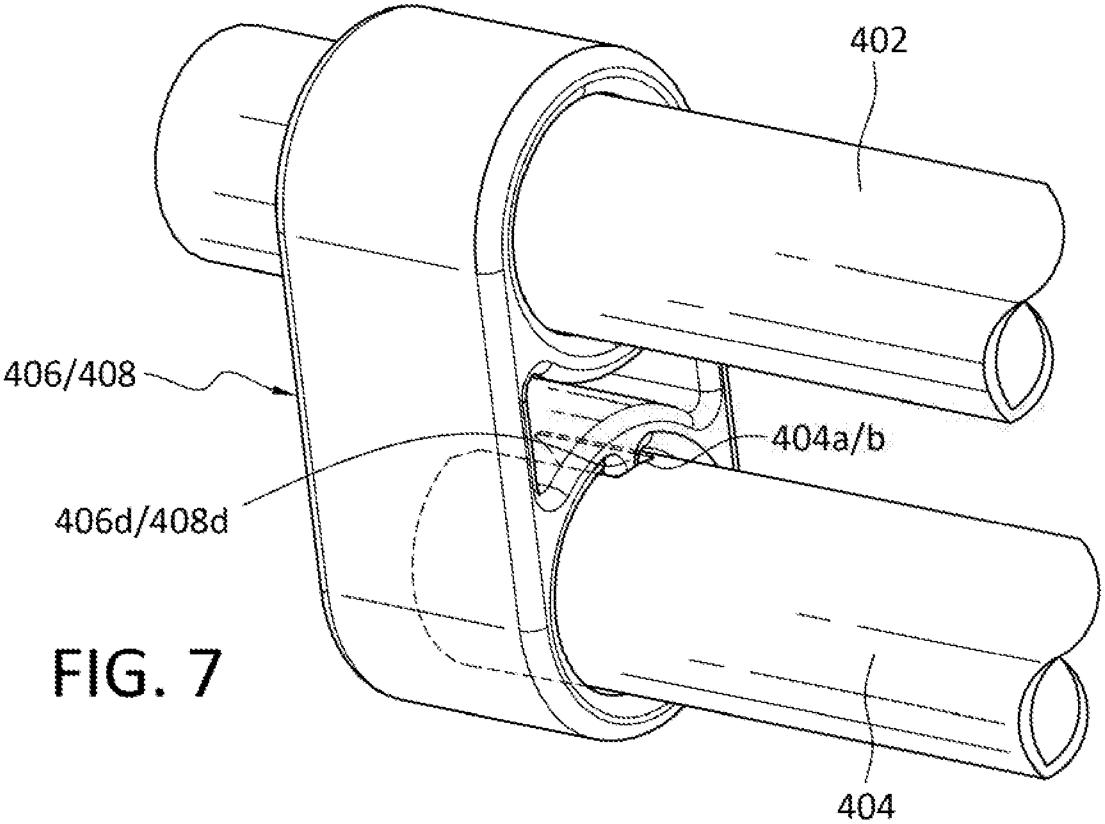
FIG. 7 is a partial perspective view of an interface between an example and example wall tube and door tube.

The present disclosure is generally concerned with hinges suitable for use with panels, doors, and other structures. For example, a hinge may have a dual axis configuration in which one of the axes may be movable relative to the other. This configuration may enable a structure connected to the hinge to rotate about both axes when opening and closing. The dual axis hinge may be configured such that rotation of the structure about the first axis is prevented, or limited, at certain orientations, or a range of orientations, of the rotating structure relative to the second axis.

Some particular example embodiments comprise a double jointed hinge that rotatably connects a door, and a structure such as wall or panel, together, while enabling the door to rotate at least about 180 degrees with respect to the structure to which it is connected.

A. General Aspects of Some Example Embodiments

In general, structures such as, but not limited to, wall panels, doors, floor panels, and gables, disclosed herein may be constructed with a variety of components and materials including, but not limited to, plastic (including blow molded plastic structures and components), including polycarbonates, composites, metals, wood, rubber, and combinations of any of the foregoing. Suitable metals may include steel, aluminum, and aluminum alloys, although the skilled person will understand that a variety of other metals may be employed as well and the scope of the invention is not limited to the foregoing examples. Where metal is employed in the construction of one of the disclosed components, the metal components may take one or more forms including, but not limited to, pipe, square tube, rectangular tube, round tube, pipe, angles, flatbar, I-shapes, T-shapes, L-shapes, and combinations and portions of any of the foregoing.

Depending upon the material(s) employed in the construction of the disclosed embodiments, a variety of methods and components may be used to connect, releasably or permanently, various components of the disclosed embodiments. For example, the various plastic and metal components within the scope of this disclosure may be attached to each other by any one or more of allied processes such as welding or brazing, and/or mechanically by way of fasteners such as bolts, screws, pins, and rivets, for example.

Further, hinges such as those disclosed herein may be removably attached to structures by way of fasteners such as screws, or bolts, for example. In some embodiments, hinges may be attached to structures in such a way that the hinges are not readily removed, such as by rivets for example. In contrast, screws and bolts are constructed in such a way, that is, with threads, so that they may be readily removed from a structure to which they may be connected.

Some, none, or all of portions of a one or more of the disclosed components may be coated or otherwise covered with paint, rubber, plastic or other materials, or any combination of the foregoing. Surface treatments and textures may also be applied to portions of the disclosed components. At least some of such materials may serve to help prevent, or reduce, rust and corrosion.

As well, the present disclosure refers to various components being connected to each other in various ways. Such components may be connected directly to each other, or indirectly to each other. Where no particular connection is specified, the various components may be connected either directly, or indirectly, to each other.

In the case of a direct connection, a first component may be releasably connected to a second component and held in that arrangement by one or more retaining components such as a pin, sleeve, bolt, rivet, shaft, or stud, to name some examples. Alternatively, and still with reference to the case of the direct connection, the first component and second component may be directly, and permanently, connected to each other such as by welding, brazing, or any other process that effects a permanent connection between the components.

With reference to the case of an indirect connection, a first component may be indirectly connected to a second component by virtue of both of those components being connected to one or more intervening components. This indirect connection may be implemented by way of by one or more retaining components such as a pin, sleeve, bolt, rivet, shaft, or stud, to name some examples. Alternatively, and still with reference to the case of an indirect connection, the first component and second component may be indirectly, and permanently, connected to each other by way of one or more intervening components to which the first component and second component are attached, such as by welding, brazing, or any other process that effects a permanent connection between the components.

In at least some embodiments, a portion, or all, of various components of example embodiments may be constructed of blow molded plastic, one example of which is high-density polyethylene (HDPE), although other plastics can alternatively be used. Examples of such components that can be made of blow molded plastic include a wall panel, a door, a gable, and a floor panel.

The scope of this disclosure is not limited to blow molding processes or blow molded components however. Thus, other example processes that may be used to construct a portion, or all, of any of the aforementioned components include roto-molding, vacuum molding, drape molding, and processes sometimes referred to as twin-sheet processes including twin-sheet molding. Any of these processes may produce a component that is partly, or completely, hollow. Finally, it will also be appreciated that components of the disclosed embodiments need not be constructed from plastic and may be constructed using other materials having other suitable characteristics.

As noted herein, any component of an embodiment that is constructed at least partly of blow molded plastic may have an interior that is partly, or completely, hollow. Such embodiments may also include, disposed in the interior, one or more depressions, sometimes referred to as "tack-offs." In such embodiments, these tack-offs may be integrally formed as part of a unitary, one-piece structure during the blow molding process. The depressions may extend from a first surface, such as a first interior surface of a component, towards a second surface, such as a second interior surface of the component. The ends of one or more depressions may contact or engage the second surface, or the ends of one or more of the depressions may be spaced apart from the second surface by a distance. Both types of depressions may be present in a single embodiment.

In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depressions that contact each other, and depressions that are spaced apart from each other, may both be present in a component of one or more disclosed embodiments. The depressions may be sized and configured to strengthen and/or reinforce the component in which they are present.

Finally, it is a characteristic of blow molded plastic structures, such as the disclosed examples of a door, wall panel, gable, and floor panel, that they take the form of a unified, single piece structure that is formed by a single blow molding process. These structures are fully formed upon completion of the blow molding process. By way of contrast, thermoformed and vacuum formed parts are typically constructed from multiple separate pieces which, after they are created, must then attached together in some manner to create the final structure. Thus, the use of blow molding processes to create unified, single piece, structures may eliminate the need for post-formation assembly and attachment processes that are required in other processes. In at least some instances, blow molded structures may include one or more part lines, that is, a small ridge or protrusion of plastic that is formed where the mold halves come together.

B. Structural Aspects of Some Example Embodiments

Directing attention first to FIGS. 1 and 1*b*, aspects of an example apparatus 100 are disclosed. The apparatus 100 may include a first structure, such as a wall panel 200 for example, connected to a second structure, such as a door 300 for example, by way of a double jointed hinge assembly 400. Both the wall panel 200 and door 300 may take the form of blow molded plastic structures. As well, in some embodiments, the door 300 and wall panel 200 may comprise elements of a building or shed, such as a garden shed or storage shed for example, although the scope of the invention is not limited to sheds, nor to any other particular structure(s). It is noted that the scope of the invention is not limited to a blow molded plastic door and/or a blow molded plastic wall panel however.

More generally, the scope of the invention embraces any structural elements, regardless of their size, configuration, or material, which are, or may be, connected to each other by way of one or more double jointed hinge assemblies, examples of which are disclosed herein. Thus, reference is made to plastic doors and wall panels, and other plastic elements, only by way of example, and is not intended to limit the scope of the invention in any way.

The example double jointed hinge assembly 400 includes a first hinge element, such as a wall tube 402 for example, and a second hinge element, such as a door tube 404 or example. It should be understood that the scope of the invention is not limited to these example implementations of a first hinge element and second hinge element. For example, the first hinge element and/or second hinge element may be solid, rather than tubular. In some embodiments, one or both of the first and second hinge elements may be made of metal, although that is not required, and the other materials disclosed herein may be employed instead.

Where a wall tube 402 and door tube 404 are employed, the wall tube 402 may be at least partly, or completely, disposed within an interior of the wall panel 200, and the door tube 404 may be at least partly, or completely, disposed within an interior of the door 300, although neither of these arrangements is required. Thus, in some embodiments, the wall tube 402 may be at least partly positioned on an exterior of the wall panel 200, and the door tube 404 may be at least partly positioned on an exterior of the door 300. In some embodiments, a wall tube 402 and/or a door tube 404 may be made of metal such as aluminum, or steel, and may extend a majority of a height of the wall panel 200 and the door 300, respectively.

With reference now to FIGS. 2-8, and continued reference to FIGS. 1*a* and 1*b*, The wall tube 402 and door tube 404 may be connected together by one or more devices, such as a link 406 and a link 408 for example. The links 406 and 408 may be made of plastic, metal, and/or other material(s). The links 406 and/or 408 may each be formed, such as by injection molding or other process, as a single respective piece of material whose constituent portions are integral with each other.

In at least some embodiments, the link 406 may be located at, or near, the bottom of the wall tube 402, and the link 408 may be located at, or near, the top of the wall tube 402. Among other things, the links 406 and 408 may be configured, such as by virtue of their respective lengths, and arranged, to maintain a fixed distance between the wall tube 402 and the door tube 404, while also allowing the door tube 404 to move relative to wall tube 402, such as by rotating about the wall tube 402.

The lengths of the links 406 and 408 may be selected as needed. The lengths of the links 406 and 408 may be a function, at least in part, of geometrical considerations such as the thickness of the wall panel 200 and/or the thickness of the door 300. For example, and with particular reference to FIG. 1*b*, the links 406 and 408 may be long enough to enable the door 300 to assume a position parallel to the wall panel 200 and/or a position where the door 300 is positioned generally end-to-end with respect to the wall panel 200.

As well, the lengths of the links 406 and 408 may be based at least in part on a distance between the wall tube 402 and the door tube 404, and/or the particular position of the wall tube 402 and door tube 404 in the respective structures where they are received. In general, the respective lengths of links 406 and 408 are such as to enable the door 300 to rotate in a range of about 0 degrees to about 180 degrees with respect to the wall panel 200.

The links 406 and 408 may be connected to the wall tube 402 and door tube 404 in any suitable manner and/or using any suitable structure(s). In the illustrated example, the link 406 includes a first portion 406*a* which may define a generally circular opening sized and arranged to receive a corresponding portion of the wall tube 402 which may be rotatable within that opening. That is, in this illustrative example, the first portion 406*a* comprises a cylindrical portion that defines an opening through which a portion of the wall tube 402 may extend. The link 406 further includes a second portion 406*b* which may be connected to the first portion 406*a* by a body portion 406*c* of the link 406. The second portion 406*b* may be configured to be received, permanently or removably, by the door tube 404. That is, in this illustrative example, the second portion 406*b* comprises a pin which may extend partway into the door tube 404. More generally, the link 406 may comprise complementary structures, such as first portion 406*a* and second portion 406*b*, configured to engage, permanently or removably, with the wall tube 402 and door tube 404, respectively.

In at least some embodiments, the link 408 comprises similar elements as the link 406, namely, a first portion 408*a*, second portion 408*b*, and body portion 408*c*, that are configured, and operate, similarly or identically to the first portion 406*a*, second portion 406*b*, and plate 406*c*, respectively. It is not required however that the links 406 and 408 be identical to the other.

Because the links 406 and 408 may both be connected to the wall tube 402 and door tube 404, the links 406 and 408 may be vertically aligned with each other, as shown in FIG. 2 for example. As well, the links 406 and 408 may be configured and arranged to move in unison with each other as the door 300 changes position and/or orientation relative to the wall panel 200.

As further indicated in the Figures, particularly FIG. 1*b*, the wall tube 402 may define a first axis 'Axis1' and the door tube 404 may define a second axis 'Axis2.' In the illustrated example, Axis1 and Axis2 extend generally vertically, and are parallel to each other (see FIGS. 1*a* and 2). Because the position of the wall tube 402 may be fixed, by virtue of the wall tube 402 being connected to the fixed wall panel 200, the position and orientation of Axis1 may likewise be fixed. On the other hand, Axis2 is defined by door tube 404, so that the position of Axis2 relative to Axis1 may be changed, although the parallel orientation of Axis2 to Axis1 is not changed as Axis2 moves relative to Axis1. Particularly, and as shown in the top view of FIG. 1*b* for example, Axis2 may be rotated about Axis1, over a range of about 0 degrees to about 90 degrees, plus or minus about 5 degrees. As used herein, the about 0 degrees position of Axis2 relative to Axis1 is a position which corresponds to a fully closed position ('Door Closed' in FIG. 1*b*) of the door 300 relative to the wall panel 200.

C. Operational Aspects of Some Example Embodiments

With continued reference to the Figures, in operation, the double jointed hinge assembly 400 may enable the door 300 to not only move through a range of about 180 degrees relative to the wall panel 200, but may also enable the door 300 to assume a variety of positions and orientations relative to the wall panel 200. For example, and directing particular attention to the top view of FIG. 1*b*, the door 300 may assume a closed position in which the door 300 is aligned with the wall panel 200 along a line "L" that is defined by Axis2 and Axis1. As well, the door 300 may be rotated about 90 degrees about Axis2 from the closed position to an orientation, or half open position, in which the door 300 is generally perpendicular to the wall panel 200, as also indicated in FIG. 1*b*. It can also be seen that in the half open position of the door 300, the links 406 and 408 have not changed their position or orientation relative to their position and orientation when the door 300 was in the closed position. Correspondingly, Axis2 has not changed its position relative to Axis1. Rather, only the door 300 has changed its position and orientation in the move from the fully closed position to the half open position.

When the door 300 has rotated to the half open position, it may then be moved to the fully open position which may about 180 degrees, plus or minus about 5 degrees, away from the fully closed position, or about 90 degrees from the half open position. This movement from the half open position to the fully open position may be accomplished, for example, by maintaining the orientation of the door 300 relative to the links 406 and 408, and pivoting the links 406 and 408 about Axis1, defined by the wall tube 402, until the door 300 assumes the fully open position indicated in the Figures. As shown, the door 300 may be folded flat, or nearly so, against the wall panel 200. In the fully open position, the door 300 may parallel, or nearly so, with the wall 200. In this example, once the door 300 has been moved from the closed position to the half open position, further rotation of the door 300 about Axis2 toward the wall 200 may no longer be necessary and in some embodiments, but not necessarily all, such further rotation about Axis2 may be prevented by the wall 200 and/or by interference between the door 300 and the structure of the links 406 and 408, as indicated in FIG. 1*b* for example. In either instance however, once the door 300 is in the half open position, the door 300 may be rotated about Axis1, at least, to the fully open position.

In some embodiments, the door 300, links 406 and 408, and/or the wall panel 200, may include one or more stops or other structures that act to limit the extent to which the door 300 can be rotated about Axis2. For example, such stops or other structures may limit the range of rotation (counterclockwise in the top view) of the door 300 about Axis2 to about 90 degrees from the closed position. In other embodiments, such stops are omitted and the door 300 can rotate about Axis2 until further rotation is prevented by the wall panel 200. In at least some embodiments, rotation of the door 300 in a clockwise direction (from the perspective of the top view) from the closed position is prevented, while in other embodiments, clockwise rotation of the door 300 is possible.

As well, while in some embodiments, the door 300 must be rotated all the way to the half open position before being moved to the fully open position, in other embodiments, the door 300 need not be rotated all the way to the half open position before being moved to the fully open position. That is, in such other embodiments, the door 300 can be rotated about Axis2 less than 90 degrees from the closed position, and then rotated to the fully open position about Axis1. In this case, the door 300 may rotate simultaneously about Axis1 and Axis2 at least part of the time that the door 300 is being moved from the closed position to the fully open position.

Thus far, this discussion has considered operation of example embodiments regarding movement of a door, for example, from a closed position to a fully open position, and various intermediate positions between closed and fully open. With continued attention to the Figures, operations involving movement of a door 300, for example, from a fully open position to a closed position and to various intermediate positions between the fully open position and the closed position.

In some embodiments, movement of the door 300 away from the fully open position can be implemented by first rotating the door 300 about the Axis1. In this example, there may be no rotation about the Axis2 in connection with this initial movement. In other cases however, the initial movement of the door 300 away from the fully open position toward the closed position can involve rotation of the door 300 about Axis1 and, simultaneous with this rotation about Axis1, rotation of the links 406 and 408 about Axis2. In some embodiments, rotation of the links 406 and 408 about Axis2 is prevented, such as by stops or other structure disclosed herein, until the door 300 has been moved from the fully open position to the half open position, or within about 5 degrees on either side of the half open position.

In any case, after the door 300 has been moved from the fully open position to the half open position, and as shown in the Figures, Axis2 has correspondingly rotated about 90 degrees clockwise with respect to Axis1, such that Axis2 is in a position that corresponds to a closed position of the door 300, although the door 300 itself is only at the half open position and is not yet in the closed position. At this point, further rotation of the links 406 and 408 about Axis1 is prevented, although rotation of the door 300 about Axis2 is still possible. The door 300 can then be rotated about Axis2 from the half open position to the closed position.

As apparent from the present disclosure, embodiments of the double jointed door hinge 400 may enable a compound rotational motion of a door, or other structure. Such a compound motion may involve rotation of the door about two different axes that may be parallel with, and offset from, each other. The motions, that is, rotation about Axis1 and rotation about Axis2, that make up a compound motion, may take place at the same time, at different respective times, in overlapping time periods, or any combination of the foregoing.

D. Further Aspects of Some Example Embodiments

With continued reference to the Figures, details are provided concerning further aspects of some example embodiments of the invention. For example, and as best shown in FIGS. 5-8 in particular, some example embodiments of the door tube 404 may include first complementary structures 404*a/b*, which may take the form of a notch for example, that may be configured to engage corresponding second complementary structures 406*d*/408*d* of the links 406 and 408, respectively. In the illustrated example, the second complementary structures 406*d*/408*d* are configured in the form of protrusions. However, no particular configuration of the first complementary structures 404*a/b* and the second complementary structures 406*d*/408*d* is required and the foregoing configurations are presented only by way of example.

In general, the first complementary structures 404*a/b* and the second complementary structures 406*d*/408*d* engage each other in such a way as to prevent rotation of the door tube 404 around its own axis, that is, Axis1. In the particular example of FIG. 7, each of the second complementary structures 406*d*/408*d* is received in a respective complementary structure 404*a*/404*b*. This configuration and arrangement may help to prevent, or at least reduce, door sag, and other problems. As well, this configuration and arrangement may also help to ensure that the links 406 and 408 move in unison with each other.

Figure 8:
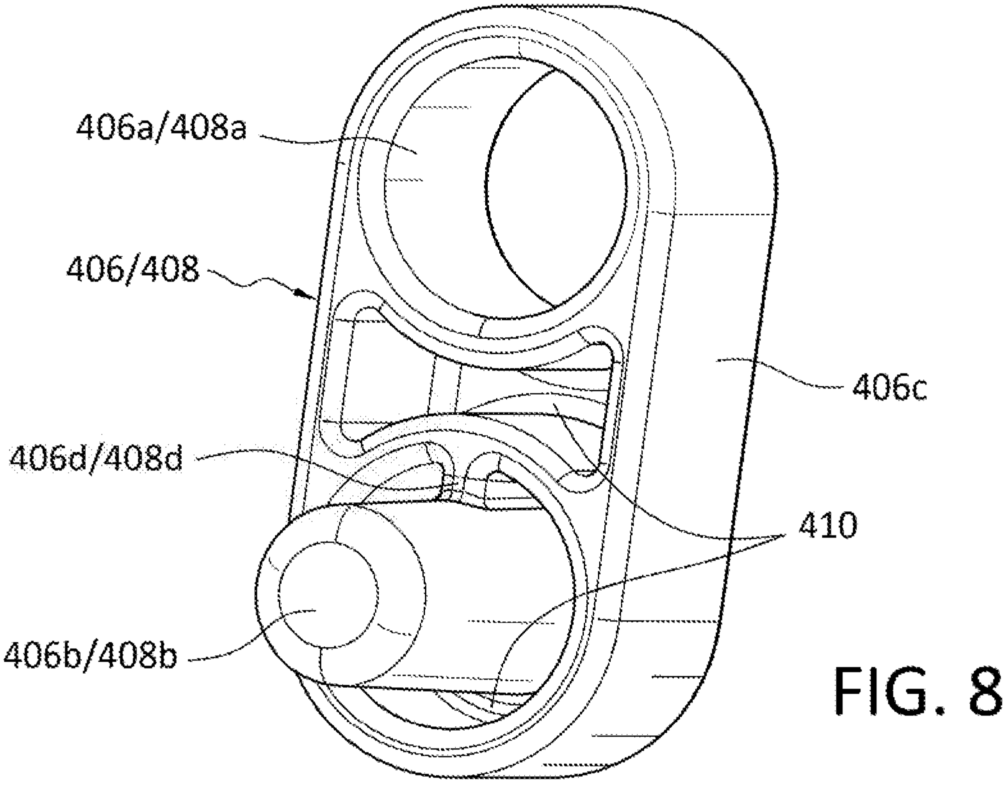
FIG. 8 is a detail view of an example link.

As well, and with particular reference to FIG. 8, at least some embodiments of the links 406 and 408 may include closed off portions 410 that may help to reduce, or eliminate, the ingress and collection of water and other foreign materials to the links 406/408 and/or the door tube 404. In other embodiments, the closed off portions 410 may be omitted.

Finally, various other features and elements may be included in some example embodiments of the invention. For example, and with reference to FIG. 1, the door 300 may include a flange 302 that runs vertically along part, or all, of the door 300. The flange 302 may be configured and arranged so that when the door 300 is in the closed position, the flange 302 covers a gap between the door 300 and the wall panel 200, thereby preventing rain and wind from entering the interior of the shed through the gap.

E. Advantageous Aspects of Some Embodiments

As will be apparent from the disclosure, one or more embodiments of the invention can provide one or more advantageous and unexpected effects, in any combination, some examples of which are set forth below. It should be noted that such effects enumerated herein are neither intended, nor should be construed, to limit the scope of the claimed invention in any way.

For example, one or more embodiments of the invention may be advantageous inasmuch as they provide for a double jointed hinge that enables a structure, such as a door for example, to rotate about 180 degrees with respect to a structure, such as a wall for example, to which the door is rotatably connected. An embodiment of the invention may enable a compound movement of a structure such as a door by employing two separate axes of rotation that are offset from each other so as to enable 0-180 degree rotation of a structure, such as a planar structure for example, relative to another structure, which may also be planar in form. An embodiment of the invention may enable a structure such as door, for example, to (i) be rotated relative to another structure to which the door is attached, while also enabling the door to (ii) be moved into, and out of, a plane that is parallel to a plane in which that structure is disposed, and to (iii) reside in the same plane as the structure to which the door is connected. An embodiment of the invention may enable a structure such as a door to be positioned so that the door does not block any portion of an opening such as an associated doorway.

F. Some Further Example Embodiments

Embodiment 1. An apparatus, comprising: a first hinge element that defines a first axis of rotation, and the first hinge element is configured to be connected to a first structure; a second hinge element that defines a second axis of rotation and is configured to be connected to a second structure, and the second hinge element is spaced apart from the first hinge element; and a first link and a second link, the first link and the second link connecting the first hinge element to the second hinge element.

Embodiment 2. The apparatus as recited in embodiment 1, wherein the second hinge element is movable relative to the first hinge element.

Embodiment 3. The apparatus as recited in any of embodiments 1-2, wherein the second hinge element is rotatable about the first hinge element.

Embodiment 4. The apparatus as recited in any of embodiments 1-3, wherein the first hinge element comprises a first tube, and the second hinge element comprises a second tube.

Embodiment 5. The apparatus as recited in any of embodiments 1-4, wherein the first link and the second link each include a first portion configured to receive part of the first hinge element, and a second portion configured to engage the second hinge element.

Embodiment 6. The apparatus as recited in any of embodiments 1-5, wherein the second hinge element is rotatable about the first hinge element over a range of about 0-90 degrees.

Embodiment 7. The apparatus as recited in any of embodiments 1-6, wherein the first link and the second link maintain a fixed distance between the first hinge element and the second hinge element.

Embodiment 8. The apparatus as recited in any of embodiments 1-7, wherein one or both of the first link and the second link are configured to prevent rotation of the second hinge element about the second axis.

Embodiment 9. An assembly, comprising: a first structure; a second structure; and a double jointed hinge that connects the first structure and the second structure, the double jointed hinge comprising: a first hinge element that defines a first axis of rotation, and the first hinge element is connected to the first structure; a second hinge element that defines a second axis of rotation and is connected to the second structure, and the second hinge element is spaced apart from the first hinge element; and a first link and a second link, the first link and the second link connecting the first hinge element to the second hinge element.

Embodiment 10. The assembly as recited in embodiment 9, wherein the first structure is a wall and the second structure is a door.

Embodiment 11. The assembly as recited in any of embodiments 9-10, wherein the second structure is rotatable about 180 degrees relative to the first structure.

Embodiment 12. The assembly as recited in any of embodiments 9-11, wherein the second structure is rotatable about 180 degrees relative to the first hinge element and about 90 degrees relative to the second hinge element.

Embodiment 13. The assembly as recited in any of embodiments 9-12, wherein the second hinge element is movable relative to the first hinge element.

Embodiment 14. The assembly as recited in any of embodiments 9-13, wherein the second hinge element is rotatable about the first hinge element.

Embodiment 15. A portion of a shed, comprising: a blow molded plastic door; a blow molded plastic wall panel; and a double jointed hinge that connects the blow molded plastic door and the blow molded plastic wall panel, the double jointed hinge comprising: a first hinge element that defines a first axis of rotation, and the first hinge element is connected to the blow molded plastic wall panel; a second hinge element that defines a second axis of rotation and is connected to the blow molded plastic door, and the second hinge element is spaced apart from the first hinge element; and a first link and a second link, the first link and the second link connecting the first hinge element to the second hinge element.

Embodiment 16. The shed portion as recited in embodiment 15, wherein the first hinge element is a wall tube that is at least partly disposed within the blow molded plastic wall panel, and the second hinge element is a door tube that is at least partly disposed within the blow molded plastic door.

Embodiment 17. The shed portion as recited in any of embodiments 15-16, wherein the blow molded plastic door has a range of motion of about 180 degrees relative to the blow molded plastic wall panel.

Embodiment 18. The shed portion as recited in any of embodiments 15-17, wherein when the blow molded plastic door is fully open, it is positioned at the exterior side of the blow molded plastic wall panel.

Embodiment 19. The shed portion as recited in any of embodiments 15-18, wherein the blow molded plastic door is rotatable about both the first axis and the second axis.

Embodiment 20. The shed portion as recited in any of embodiments 15-19, wherein the blow molded plastic door has a range of motion of about 90 degrees about the first axis.

Although this disclosure has been described in terms of certain example embodiments, other embodiments apparent to those of ordinary skill in the art are also within the scope of this disclosure.

What is claimed is:

1. An apparatus, comprising:
- a first hinge element;
- a second hinge element; and
- a first link and a second link, the first link and the second link configured to connect the first hinge element to the second hinge element so that the second hinge element is spaced apart from the first element, and wherein when so connected, the first hinge element extends through the first link and through the second link, and the second hinge element does not extend through the first link or through the second link,
- wherein the second hinge element comprises a first complementary structure and the second link comprises a second complementary structure, and the first complementary structure and the second complementary structure are configured to engage each other so as to prevent rotation of the second hinge element about an axis defined by the second hinge element.

2. The apparatus as recited in claim 1, wherein the second hinge element is rotatable about an axis defined by the first hinge element when the first hinge element and the second hinge element are connected by the first link and the second link.

3. The apparatus as recited in claim 1, wherein when the first link and the second link are connected to the first hinge element and the second hinge element, the first link and the second link are rotatable about the first hinge element so as to enable movement of the second hinge element relative to the first hinge element.

4. The apparatus as recited in claim 1, wherein the first link and the second link each include a first portion configured to receive part of the first hinge element, and a second portion configured to engage the second hinge element.

5. The apparatus as recited in claim 1, wherein the second hinge element is rotatable about the first hinge element over a range of about 0-90 degrees when the first hinge element and the second hinge element are connected by the first link and the second link.

6. The apparatus as recited in claim 1, wherein the first link and the second link maintain a fixed distance between the first hinge element and the second hinge element when the first hinge element and the second hinge element are connected by the first link and the second link.

7. The apparatus as recited in claim 1, wherein one of the first complementary structure and the second complementary structure is at least partly received within the other of the first complementary structure and the second complementary structure when the first hinge element and the second hinge element are connected by the first link and the second link.

8. An assembly, comprising:

a first structure;

a second structure; and a double jointed hinge that connects the first structure and the second structure, the double jointed hinge comprising:

a first hinge element that defines a first axis of rotation, and the first hinge element is connected to the first structure;

a second hinge element that defines a second axis of rotation and is connected to the second structure, and the second hinge element is spaced apart from the first hinge element; and a first link and a second link, the first link and the second link connecting the first hinge element to the second hinge element, wherein the first link and the second link are rotatable about the first hinge element so as to enable movement of the second hinge element relative to the first hinge element, and wherein the first hinge element extends through the first link and through the second link, and the second hinge element does not extend through the first link or through the second link.

9. The assembly as recited in claim 8, wherein the first structure is a wall and the second structure is a door.

10. The assembly as recited in claim 8, wherein the second structure is rotatable about 180 degrees relative to the first structure.

11. The assembly as recited in claim 8, wherein the second structure is rotatable about 180 degrees relative to the first hinge element and about 90 degrees relative to the second hinge element.

12. The assembly as recited in claim 8, wherein the second hinge element is movable relative to the first hinge element.

13. The assembly as recited in claim 8, wherein the second hinge element is rotatable about the first hinge element.

14. A portion of a shed, comprising:

a blow molded plastic door;

a blow molded plastic wall panel; and a double jointed hinge configured to connect the blow molded plastic door and the blow molded plastic wall panel to each other, the double jointed hinge comprising:

a first hinge element that connectible to the blow molded plastic wall panel;

a second hinge element that is connectible to the blow molded plastic door; and a first link and a second link, the first link and the second link configured to connect the first hinge element to the second hinge element so that the second hinge element is spaced apart from the first element, and wherein when so connected, the first hinge element extends through the first link and through the second link, and the second hinge element does not extend through the first link or through the second link.

15. The shed portion as recited in claim 14, wherein the first hinge element is a wall tube that, when the shed portion is in an assembled state, is at least partly disposed within the blow molded plastic wall panel, and the second hinge element is a door tube that, when the shed portion is in an assembled state, is at least partly disposed within the blow molded plastic door.

16. The shed portion as recited in claim 14, wherein when the shed portion is in an assembled state, the blow molded plastic door has a range of motion of about 180 degrees relative to the blow molded plastic wall panel.

17. The shed portion as recited in claim 14, wherein when the shed portion is in an assembled state, the blow molded plastic door is fully open, the blow molded plastic door is positioned at an exterior side of the blow molded plastic wall panel.

18. The shed portion as recited in claim 14, wherein when the shed portion is in an assembled state, the blow molded plastic door is rotatable about both the first axis and the second axis.

19. The shed portion as recited in claim 14, wherein when the shed portion is in an assembled state, the blow molded plastic door has a range of motion of about 90 degrees about the first axis.

20. The shed portion as recited in claim 14, wherein when the shed portion is in an assembled state, and the blow molded plastic door is open to a position more than 90 degrees relative to the plastic wall panel, the first link and the second link extend out from a recess cooperatively defined by the blow molded plastic wall panel and the blow molded plastic door.

21. The shed portion as recited in claim 14, wherein when the shed portion is in an assembled state, and the blow molded plastic door is fully closed, the first link and the second link are received within a recess cooperatively defined by the blow molded plastic wall panel and the blow molded plastic door.

22. The shed portion as recited in claim 14, wherein when the shed portion is in an assembled state, the blow molded plastic door is configured to assume a state in which the blow molded plastic door is fully closed, and the first link and the second link are received within a recess cooperatively defined by the blow molded plastic wall panel and the blow molded plastic door.

23. The shed portion as recited in claim 14, wherein when the shed portion is in an assembled state, the blow molded plastic door is configured to assume a state in which the blow molded door is oriented at a position of 90 degrees, or less, relative to the plastic wall panel, and the first link and the second link remain in a recess cooperatively defined by the blow molded plastic wall panel and the blow molded plastic door.

24. The shed portion as recited in claim 14, wherein when the shed portion is in an assembled state, the blow molded plastic door is configured to assume a state in which the blow molded door is oriented at a position of greater than 90 degrees, relative to the plastic wall panel, and the first link and the second link extend out of a recess cooperatively defined by the blow molded plastic wall panel and the blow molded plastic door.

* * * * *